United States Patent
Sullivan et al.

(10) Patent No.: US 7,058,835 B1
(45) Date of Patent: Jun. 6, 2006

(54) SYSTEM, METHOD AND APPARATUS FOR CONTROLLING SUPPLY OF BACKUP POWER TO FIRST AND SECOND POWER PLANES IN THE EVENT OF A POWER FAILURE OF A MAIN POWER SUPPLY

(75) Inventors: Douglas Sullivan, Milford, MA (US); Navin Sharma, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 697 days.

(21) Appl. No.: 10/103,012

(22) Filed: Mar. 21, 2002

(51) Int. Cl.
*G06F 1/32* (2006.01)

(52) U.S. Cl. ............... 713/324; 713/300; 713/320; 713/340

(58) Field of Classification Search ........... 713/300, 713/324, 340, 320; 714/25, 2
See application file for complete search history.

(56) References Cited

U.S. PATENT DOCUMENTS

| | | | |
|---|---|---|---|
| 5,381,554 A * | 1/1995 | Langer et al. ............... | 714/14 |
| 5,790,878 A * | 8/1998 | Anderson et al. ........... | 713/340 |
| 6,044,207 A * | 3/2000 | Pecone et al. ............... | 710/314 |
| 6,262,493 B1 * | 7/2001 | Garnett ........................ | 307/64 |
| 6,681,335 B1 * | 1/2004 | Rice et al. ................... | 713/320 |

* cited by examiner

*Primary Examiner*—Lynne H. Browne
*Assistant Examiner*—Paul Yanchus
(74) *Attorney, Agent, or Firm*—BainwoodHuang (57) ABSTRACT

A circuit board includes a first circuit connected to a first power plane, a second circuit connected to a second power plane, and a power controller connected to the second power plane. The power controller connects the second power plane to a power subsystem such that the second circuit receives a main power signal through the second power plane while the power subsystem provides the main power signal to the first circuit through the first power plane. The power controller (i) detects a power failure event in which the power subsystem provides a backup power signal in place of the main power signal and, in response to the power failure event, (ii) disconnects the second power plane from the power subsystem such that the second circuit does not receive the backup power signal thus reducing backup power consumption.

24 Claims, 6 Drawing Sheets

SYSTEM, METHOD AND APPARATUS FOR CONTROLLING SUPPLY OF BACKUP POWER TO FIRST AND SECOND POWER PLANES IN THE EVENT OF A POWER FAILURE OF A MAIN POWER SUPPLY

BACKGROUND OF THE INVENTION

A typical computer system includes a power supply and one or more circuit boards (e.g., processor modules, memory modules, etc.) which are powered by the power supply. Some computer systems are equipped with both a primary power supply which converts an AC power feed from the street, and a DC battery backup power supply for fault tolerance. If the primary power supply fails and no longer provides power to computer system (e.g., if the AC power feed from the street should become unavailable), the DC battery backup power supply can take over and provide power to each circuit board of the computer system.

One conventional approach to responding to a failure of the primary power supply involves the computer system attempting to continue full operation using the DC battery backup power supply until the primary power supply becomes available again. In this approach, the DC battery backup power supply typically includes a large assembly of batteries (e.g., racks or shelves full of batteries) which, in some cases, consumes many cubic feet of space in order to store a significantly large power reserve. The computer system continues full operation using the DC battery backup power supply until the primary power supply becomes available again, or until the DC battery backup power supply runs out of power.

Another conventional approach to responding to a failure of the primary power supply involves the DC battery backup power supply providing power to the circuitry of each circuit board for a relatively short period of time (e.g., 5 to 20 minutes) to enable the computer system to perform an automated shutdown procedure which leaves the computer system in a safe and powered-down state. In this approach, the DC battery backup power supply provides power temporarily to the circuit boards of the computer system to allow each circuit board to automatically (i) complete any operations in progress, and (ii) synchronize the data in volatile memory (i.e., semiconductor memory) to a set of disk drives. At the end of the shutdown procedure, backup power to the circuit boards is turned off automatically and the computer system remains completely powered-down. When the primary power supply becomes available again, a user (e.g., a system administrator) reactivates or reboots the computer system, and the computer system can begin normal operation again.

SUMMARY OF THE INVENTION

Unfortunately, there are deficiencies to the above-described conventional approaches to responding to a failure of the primary power supply. For example, the conventional approach which involves the computer system continuing fall operation requires a DC battery backup power supply having a very large assembly of batteries. Without such a large battery assembly which can be expensive to provide and maintain, the computer system could exhaust the power reserve within the DC battery backup power supply in a relatively short amount of time and before the primary power supply becomes available again. Furthermore, even if the battery assembly of the DC battery backup power supply is large, the amount of time in which the computer system can continue full operation is substantially limited due to the large amount of power required to run all of the components of the computer system (e.g., the processor and memory modules, the fan assembly, the input/output interface, other peripheral devices, etc.). Accordingly, the success of this approach relies on the primary power supply becoming available again in a relatively short amount of time. Otherwise, it is possible that the computer system will run out of battery backup power and crash in an uncontrolled manner. In such a situation, it is possible that the results of some operations or transactions will be lost (i.e., some results may not have be synchronized to disk), and that the computer system could sustain damage by entering an undefined operating state (e.g., generate a faulty operation that overwrites good data or erases data, cause a head crash, etc.).

In the above-described conventional automatic shutdown approach, the computer system must include a set of disk drives, and (i) perform a shutdown procedure in order to synchronize the data in volatile memory and (ii) power-down in a safe manner. Without the set of disk drives, data in volatile memory will be lost when backup power to the circuit boards is turned off. Furthermore, if the shutdown procedure is unsuccessful (e.g., if a particular file lock or slow process prevents the computer system from shutting down cleanly) the exact state of the computer system may not be preserved on the set of disk drives thus preventing the computer system from recovering to the same state that existed prior to performing the shutdown procedure. Accordingly, this conventional approach requires a set of disk drives which can be expensive to provide and maintain, and important data can still be lost.

The invention is directed to techniques for powering a circuit board having, among other things, (i) a set of power planes, and (ii) circuitry that controls how power is provided to the set of power planes. Circuits of the circuit board are configured to electrically connect with a power subsystem having a main power supply and a backup power supply. In the event of a failure of the main power supply, backup power from the backup power supply can be provided to some circuitry on the circuit board, and not provided (or only temporarily provided) to other circuitry on the circuit board. If not all of the circuitry of the circuit board continues to receive backup power from the backup power supply, the rate of backup power consumption is less than that of a conventional approach of providing backup power to all of the circuitry of the entire circuit board. Thus, the required amount of reserve power is not as large as in that conventional approach. Furthermore, in the case of a computer system, if the circuitry which continues to receive backup power can remain operational for a relatively long or extended period of time due to the reduced rate of backup power consumption, there may be no need to synchronize data to disk and thus no need for a set of disk drives and no need to perform a shutdown procedure. Accordingly, one or more of the earlier-described costs and risks associated with performing a complex shutdown procedure (e.g., the costs of a set of disk drives, the chance that the shutdown will not complete properly resulting in lost data, etc.) can be avoided.

One embodiment of the invention is directed to a circuit board that includes a first circuit connected to a first power plane, and a second circuit connected to a second power plane. The circuit board further includes a power controller connected to the second power plane. The power controller is configured to connect the second power plane to a power subsystem such that the second circuit receives a main power signal (e.g., a 2.5 VDC signal converted from a main power feed from the street) through the second power plane while the power subsystem provides the main power signal to the first circuit through the first power plane. The power controller is further configured to (i) detect a power failure event in which the power subsystem provides a backup power signal (e.g., a 2.5 VDC signal from a set of batteries) in place of the main power signal and, in response to the detected power failure event and while the power subsystem provides the backup power signal to the first circuit through the first power plane, (ii) disconnect the second power plane from the power subsystem such that the second circuit does not receive the backup power signal. Since the second circuit of the circuit board does not receive the backup power signal, the power consumption of the circuit board as a whole is reduced.

In one arrangement, the power controller includes a switch which interconnects between the second power plane and the power subsystem, and a power control circuit which connects to the switch and the power subsystem. The power control circuit receives a control signal from the power subsystem indicating either that the power subsystem provides the main power signal or that the power subsystem provides the backup power signal in place of the main power signal. When the control signal indicates that the power subsystem provides the main power signal, the power control circuit provides a switch signal to the switch such that the switch connects the second power plane to the power subsystem. When the control signal indicates that the power subsystem provides the backup power signal in place of the main power signal, the power control circuit provides the switch signal such that the switch disconnects the second power plane from the power subsystem, thus reducing the amount of power consumed by the circuit board.

In one arrangement, the first circuit includes dynamic random access memory (DRAM), and the second circuit includes control logic to operate the DRAM of the first circuit. The DRAM is configured to operate in (i) a normal operating mode to store completed host transactions while the power subsystem provides the main power signal to the first circuit through the first power plane, and (ii) a self-refresh mode to maintain storage of the completed host transactions while the first circuit receives the backup power signal from the power subsystem through the first power plane, and while the second circuit does not receive the backup power signal from the power subsystem through the second power plane. Accordingly, the circuit board is suitable for use in a data storage system which stores host transactions on behalf of one or more external hosts.

In one arrangement, the power controller is configured to temporarily connect the second power plane to the power subsystem in order to provide the backup power signal to the second circuit for a temporary amount of time (e.g., 30 seconds, two minutes, etc.), prior to disconnecting the second power plane from the power subsystem. Accordingly, the control logic of the second circuit can send signals to the DRAM of the first circuit to transition the DRAM from the normal operating mode to the self-refresh mode before the second circuit is powered-down to conserve power.

The features of the invention, as described above, may be employed in electronic systems, devices and methods, as well as other electronic components such as those of EMC Corporation of Hopkinton, Mass.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for powering a circuit board (e.g., a memory module) having, among other things, (i) a set of power planes and (ii) circuitry that controls how power is provided to the set of power planes. Circuits of the circuit board are configured to electrically connect with a power subsystem having a main power supply (e.g., a converter for a main power feed from the street) and a backup power supply. In the event of a main power supply failure, backup power from the backup power supply can be provided to some circuitry on the circuit board, and not provided (or only temporarily provided) to other circuitry on the circuit board. If not all of the circuitry of the circuit board continues to receive backup power from the backup power supply, the rate of backup power consumption is less than that of a conventional approach of providing backup power to all of the circuitry of the entire circuit board. Thus, the required amount of reserve power is not as large as in that conventional approach. Furthermore, in the case of a computer system, if the circuitry which continues to receive backup power can remain operational for a relatively long or extended period of time due to the reduced rate of backup power consumption, there may be no need to synchronize data to disk and thus no need for a set of disk drives. Accordingly, one or more of the earlier-described costs and risks associated with performing a complex shutdown procedure (e.g., the costs of a set of disk drives, the chance that the shutdown will not complete properly resulting in lost data, etc.) can be avoided.

Figure 1:
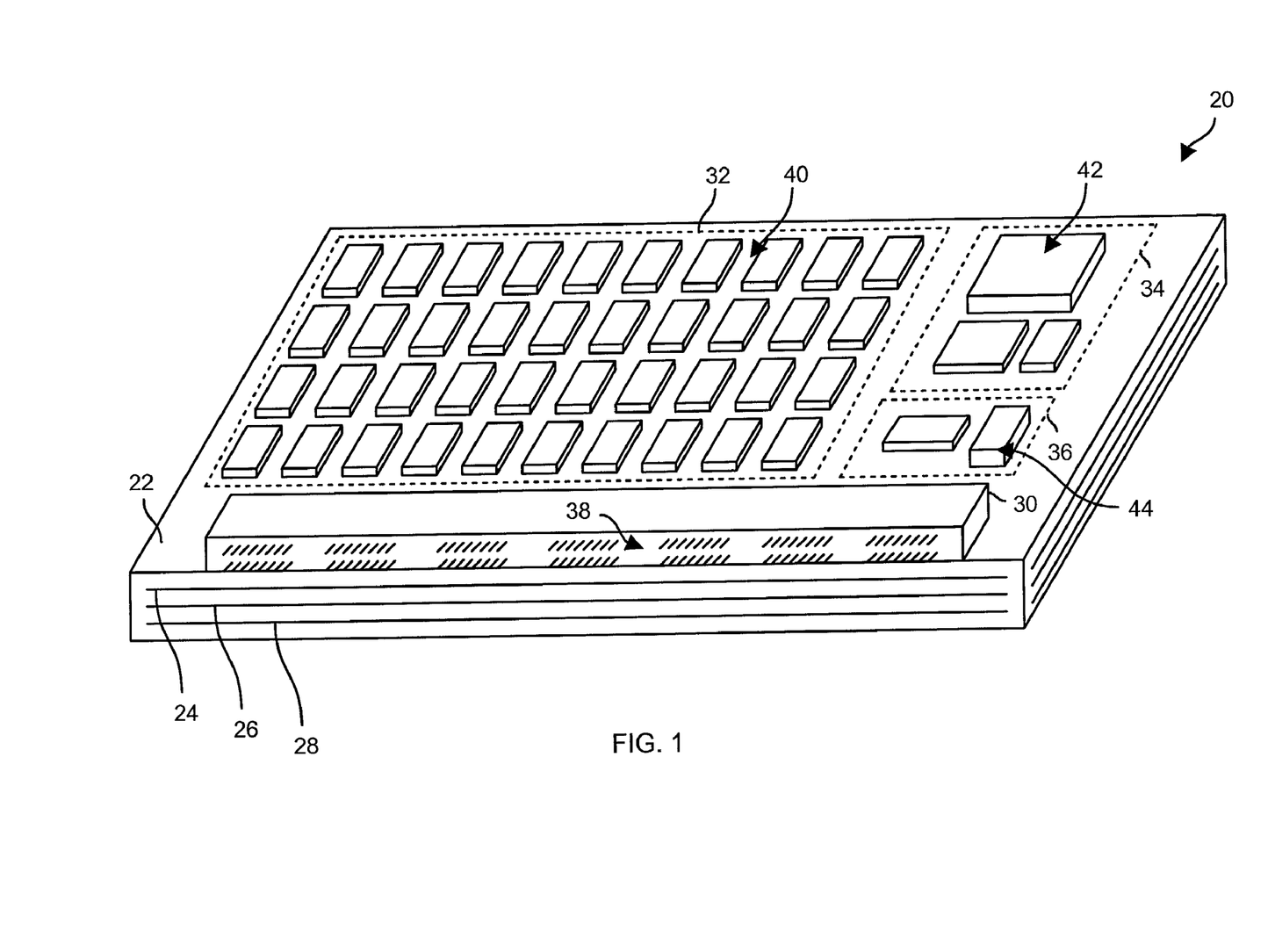
FIG. 1 is a perspective view of a circuit board which is suitable for use by the invention.

FIG. 1 shows a perspective view of a circuit board 20 which is suitable for use by the invention. The circuit board 20 includes a section 22 of circuit board material having layers of conductive and non-conductive material sandwiched together. In particular, the circuit board section 22 includes a first power plane 24, a second power plane 26 and a ground plane 28. The first power plane 24, the second power plane 26 and the ground plane 28 are electrically isolated from each other within the circuit board section 22 (i.e., non-conductive material separates each plane 24, 26, 28). Accordingly, the first and second power planes 24, 26 provide separate power domains even through they can carry the same power signal (e.g., a 2.5 VDC power signal).

As further shown in FIG. 1, the circuit board 20 further includes a set of connectors 30, a first circuit 32, a second circuit 34 and a power controller 36. The set of connectors 30 provides a set of contacts (e.g., pads, pins, tabs, leads, fingers, etc.) which electrically connects with a corresponding set of contacts (e.g., connector leads on a backplane) in order to enable power and communication signals to enter and leave the circuit board 20.

By way of example only, the circuit board 20 is a memory module which is capable of storing and retrieving data. In particular, the first circuit 32 includes a set of dynamic random access memory (DRAM) integrated circuit (IC) devices 40, i.e., semiconductor memory which provides high-speed volatile storage. The second circuit 34 includes control logic 42 (e.g., an FPGA device, a processor, combinations thereof, etc.) which controls the operation of the DRAM devices 40. The power controller 36 includes circuitry 44 which controls power signal distribution within the circuit board 20. Further details of the invention will now be provided with reference to FIG. 2.

Figure 2:
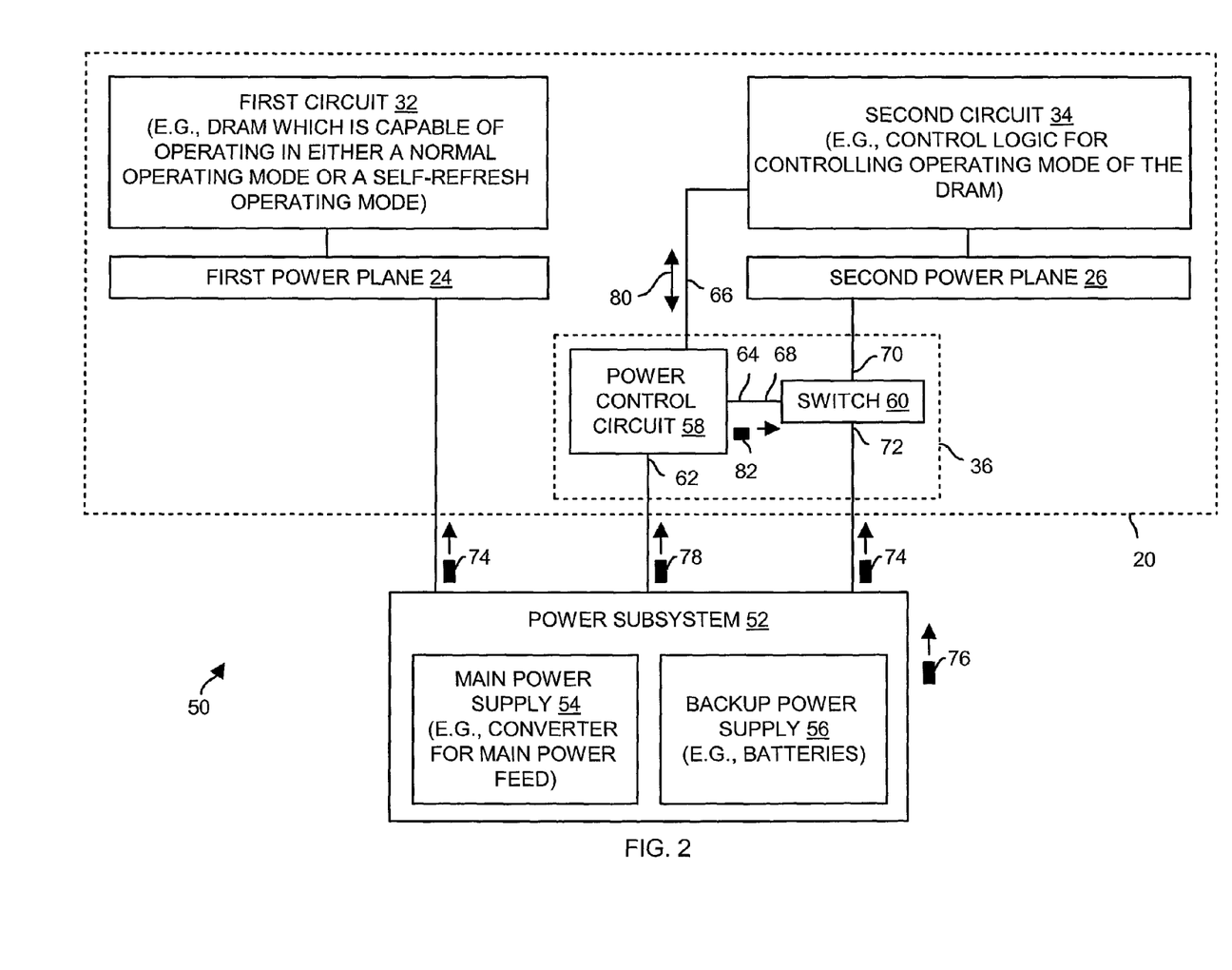
FIG. 2 is a block diagram showing particular details of the circuit board of FIG. 1 when connected to a power subsystem having a main power supply and a backup power supply.

FIG. 2 is a block diagram 50 showing particular details of the circuit board 20 of FIG. 1. In particular, the circuit board 20 is capable of electrically connecting with a power subsystem 52 having a main power supply 54 and a backup power supply 56. The main power supply 54 and the backup power supply 56 provide power to the circuitry of the circuit board 20 from different sources. In one arrangement, the main power supply 54 converts an AC power signal from a main power feed (e.g., an electrical panel leading to the street and ultimately to an external electrical power plant, a generator, etc.), and the backup power supply 56 includes a set of batteries that stores power from the main power feed when the main power supply 54 provides a main power signal, and then provides a backup power signal from the batteries when the main power supply 54 no longer provides the main power signal (e.g., due to a power outage at the street).

As further shown in FIG. 2, the first power plane 24 electrically connects with the first circuit 32, and the second power plane 26 electrically connects with the second circuit 34. The first power plane 24 is configured to connect directly to the power subsystem 52. In contrast, the power controller 36 is interconnected between the second power plane 26 and the power subsystem 52. In particular, the power controller 36 includes a power control circuit 58 and a switch (or relay) 60. The power control circuit 58 includes a power control circuit input 62 which is configured to connect with the power subsystem 52, and a power control circuit output 64. The power control circuit 58 further includes a communications link 66 with the second circuit 34. The switch 60 includes a switch input 68 which connects with the power control circuit output 64, a first terminal 70 which connects with the second power plane 26 and a second terminal 72 which connects with the power subsystem 52.

During operation, the power subsystem 52 is capable of providing a main power signal 74 (e.g., a 2.5 VDC signal converted from an AC power signal from the street) to the first and second power planes 24, 26 or, alternatively, a backup power signal 76 (e.g., a 2.5 VDC signal from batteries). The power subsystem 52 also provides a control signal 78 indicating whether the power subsystem 52 presently provides the main power signal 74, or the backup power signal 76 in place of the main power signal 74. It should be understood that the voltage values of the signals discussed throughout this document are relative to a ground reference (e.g., zero volts) such as that on the ground plane 28 (FIG. 1).

The power control circuit 58 of the power controller 36 receives the control signal 78 on the power control circuit input 62. In response to the control signal 78 and, in some arrangements, signals from other circuitry (e.g., communications signals 80 from the second circuit 34), the power control circuit 58 provides a switch signal 82. The switch 60 receives the switch signal 82 on the switch input 68, and closes or opens based on the switch signal 82. When the switch 60 closes, the switch 60 electrically connects the second power plane 26 to the power subsystem 52 (i.e., current passes through the switch terminals 70, 72). On the other hand, when the switch 60 opens, the switch 60 disconnects the second power plane 26 from the power subsystem 52. Accordingly, the power controller 36 is capable of selectively providing power or not providing power to the second circuit 34 which electrically connects to the second power plane 26.

In one arrangement, the power control circuit 58 is configurable to provide a delay before opening (or closing) the switch 60 based on the control signal 78. For example, suppose that the DRAM devices 40 of the first circuit 32 includes important data such as a set of completed host transactions (e.g., banking transactions, sale orders, etc.) which accumulated in the DRAM devices 40 while the power subsystem 52 provided the main power signal 74. Further suppose that the main power supply 54 fails (e.g., the main feed from the street becomes unavailable, the main power supply 54 encounters a problem which causes a circuit breaker to trip and turn the main power supply 54 off, etc.). In a very small amount of time (e.g., in an amount of time too short to affect any of the circuitry within the circuit board 20), the backup power supply 56 provides the backup power signal 76 in place of the main power signal 74. Accordingly, the first circuit 32 and the second circuit 34 can remain operational.

When the power subsystem 52 provides the backup power signal 76 in response to a failure of the main power supply 54, the power subsystem 52 notifies the power controller 36 using the control signal 78 (e.g., the voltage value of the control signal 78 changes). In one arrangement, this changes causes the power control circuit 58 to respond by notifying the second circuit 34 through the communications link 66 that it plans to disconnect the second power plane 26 from the power subsystem 52 shortly (e.g., after a predetermined amount of time has elapsed, after the second circuit 34 provides a feedback signal 80, etc.). The power control circuit 58 can track the elapsed time internally (e.g., using an internal clock, discharging a capacitor, etc.).

When the second circuit 34 learns that the main power supply 54 has failed, the control logic 42 of the second circuit 34 which controls the operation of the DRAM devices 40 directs the DRAM devices 40 to complete an operations which are in progress and then to transition from their normal operating modes to self-refresh modes. When in normal operating mode, the control logic 42 performed periodic memory refresh operations on each DRAM device 40 in order to sustain the data stored in the DRAM devices 40. When in self-refresh mode, the DRAM devices 40 sustain the data without requiring the control logic 42 to perform any memory refresh operations. Next, the second circuit 34 notifies the power control circuit 58 through the communications link 66 (see the arrow 80 in FIG. 2) that it is no longer necessary to provide power to the second circuit 34.

Once the power control circuit 58 receives this notification (or alternatively after the predetermined amount of time has passed), the power control circuit 58 opens the switch 60 using the switch signal 82 (e.g., changes the value of the switch signal 82) in order to disconnect the second power plane 26 from the power subsystem 52. At this point, the second circuit 34 no longer consumes power from the backup power supply 56. Hence, the power consumption of the circuit board 20 as a whole is less than the power consumption that would exist if the entire circuit board 20 were fully powered (i.e., less than if the second circuit 34 were powered by the backup power supply 56). Accordingly, the backup power supply 56 can power the circuit board 20 longer than conventional circuit boards which are fully powered and/or the backup power supply 56 can be smaller since the circuit board 20 consumes less power. In some situations, the backup power supply 56 can power the first circuit 32 of the circuit board 20 for such an extended period of time (e.g., 48 hours) that it is extremely unlikely that circuit board 20 will exhaust the power reserve of the backup power supply 56 before main power becomes available again (or before other arrangements can be made such as activating emergency generators, etc.). Further details of the invention will now be provided with reference to FIG. 3.

Figure 3:
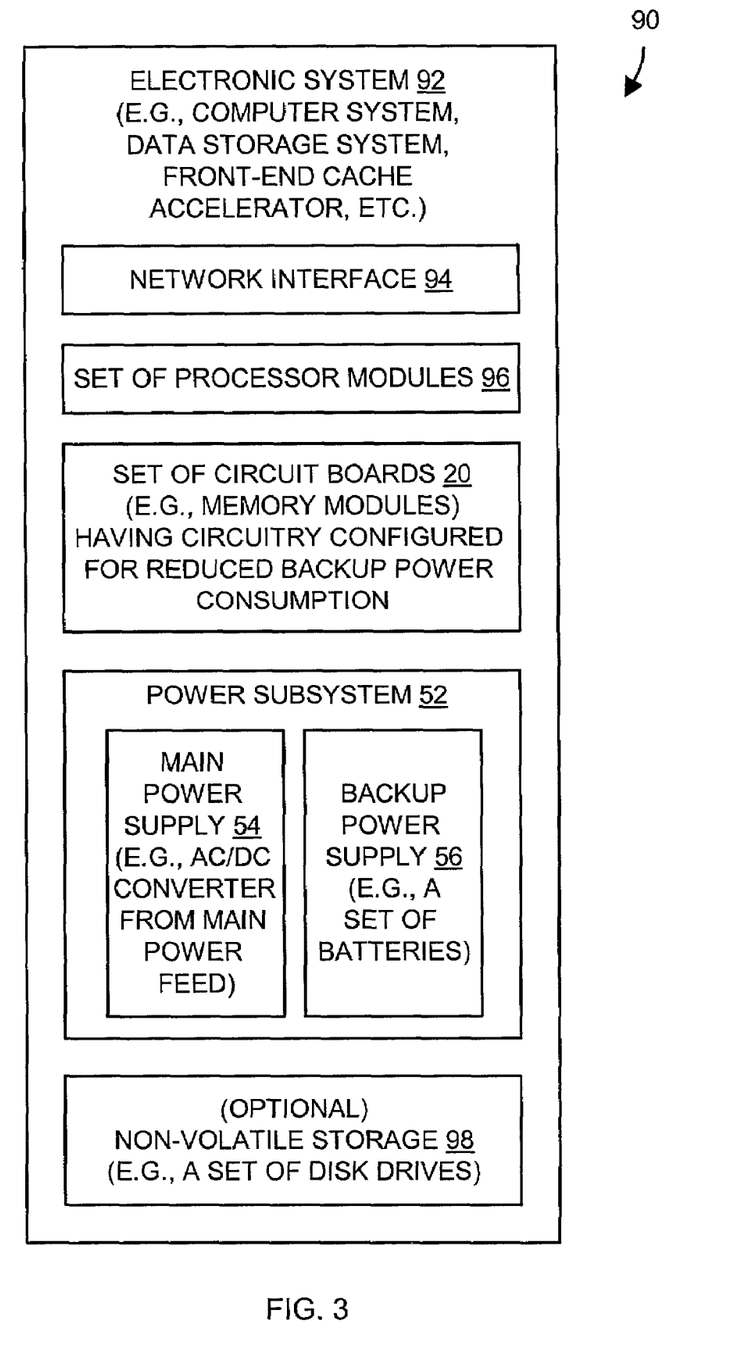
FIG. 3 is a block diagram of an electronic system having, among other things, the circuit board of FIG. 1.

FIG. 3 is a block diagram 90 of an electronic system 92 with enhanced backup power conservation circuitry. The electronic system 92 minimizes backup power consumption by utilizing a set of the circuit boards 20 (i.e., one or more circuit boards 20) and the power subsystem 52 of FIG. 2. That is, the electronic system 92 can maintain data in persistently in volatile memory when it loses access to the main power signal 74 and relies on the backup power signal 76 in place of the main power signal 74.

By way of example only, the electronic system 92 is a general purpose computer system. In another arrangement, the electronic system 92 operates as a data storage system. In yet another arrangement, the electronic system 92 operates as a front-end cache accelerator to a data storage assembly. In another arrangement, the electronic system is specialized equipment configured for a special application (e.g., a real-time system, control equipment, measurement equipment, an analog device, combinations thereof, etc.).

As shown in FIG. 3, the electronic system 92 includes a network interface 94, a set of processor modules 96, a set of the circuit boards 20, the power subsystem 52 and non-volatile storage 98 (e.g., a set of disk drives). The set of processor modules 96 derives power from the power subsystem 52 and performs operations on behalf of one or more users or hosts. The set of circuit boards 20 derives power from the power subsystem 52 and provides volatile memory for storing data in support of the operations performed by the set of processor modules 96. The non-volatile storage 98 is optional, derives power from the power subsystem 52 and provides non-volatile storage for use by the set of processor modules 96. The network interface 94 derives power from the power subsystem 52 and provides input and output communications in support of the set of processor modules 96.

During normal operation, the main power supply 54 of the power subsystem 52 provides a main power signal 74 (e.g., a power signal converted from a main power feed from the street) to the various components 94, 96, 20, 98 of the electronic system 92 to enable these components 94, 96, 20, 98 to perform operations in a traditional manner. However, if the main power supply 54 fails, the backup power supply 56 provides a backup power signal 76 (e.g., a power signal from power reserves within the backup power supply 56). During such a power failure event, each of the set of circuit boards 20 operates as described earlier (i.e., the DRAM devices 40 of the first circuit 32 complete any operations in progress, the control logic 42 of the second circuit 34 then directs the DRAM devices 40 to operate in self-refresh mode, and then the power controller 36 disconnects the second circuit 34 from the power subsystem 52) in order to reduce power consumed by the circuit boards 20 and make the data within the circuit boards 20 persist through the power failure.

Similarly, the other components 94, 96, 98 deactivate in order to conserve the power reserves of the backup power supply 56. At this point, the data within volatile memory, i.e., the data maintained within the set of circuit boards 20, is not lost. Rather, it is retained within the DRAM devices 40 of the set of circuit boards 20 because the DRAM devices 40 operate in self-refresh mode. That is, the DRAM devices 40 maintain the data stored therein without the need for periodic refresh operations which are normally performed by the control logic 42 of the second circuit 34. The DRAM devices 40 are essentially the only components which require power during an AC outage (i.e., loss of the main power feed from the street). All of the other components 94, 96, 98 which draw power during normal operation can be switched off to conserve backup power.

Accordingly, the electronic system 92 provides a high level of fault tolerance by sustaining data stored within the DRAM devices 40 for an extended amount of time without needing to perform a shutdown procedure which involves synchronizing volatile memory with the non-volatile storage 98. Furthermore, due to minimal power consumption of the electronic system 92 (i.e., power consumption by only the first circuits 32 of the circuit boards 20) compared to the conventional approach of powering all circuitry of circuit boards with backup power, the DRAM devices 40 of the circuit boards 20 can operate for an particularly long period of time before exhausting the power reserves of the backup power supply 56.

It should be understood that the enhanced power conservation feature of the invention enables a reduction in the size and/or number of cells in a battery system if such a system is used for the backup power supply 56. Such a reduction can provide a substantial cost savings since battery cells are typically heavy, take of a relatively large amount of space, and are typically prone to maintenance problems.

As explained above, the circuit board 20 of FIGS. 1 and 2 is particularly well-suited for a memory circuit board due its ability to divide power distribution into multiple power domains, and then turn off power so that not all of the power domains receive power during a failure of the main power supply 54. The operation of the circuit board 20 from the perspective of the power controller 36 will now be summarized with reference FIG. 4.

Figure 4:
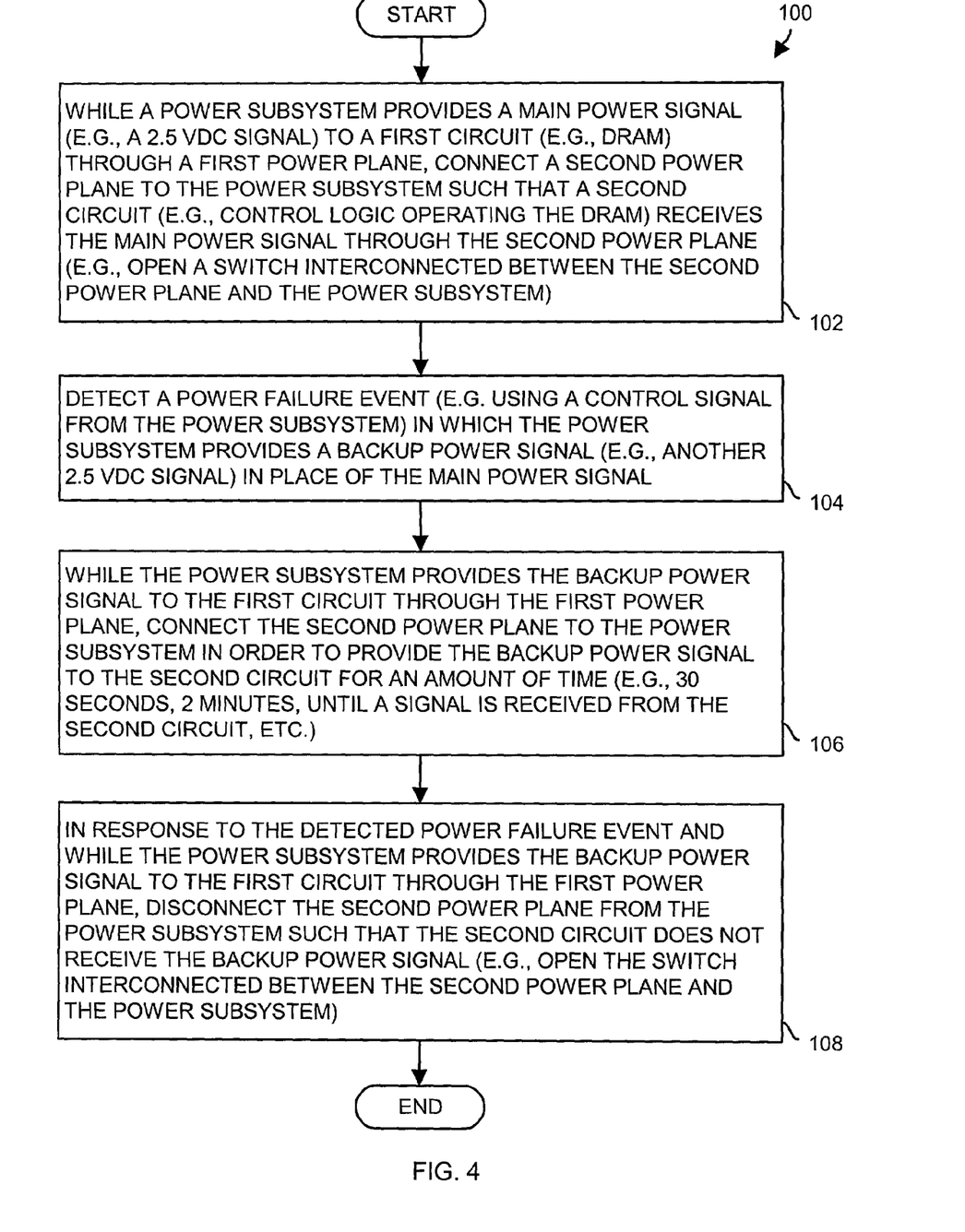
FIG. 4 is a flowchart of a procedure which is performed by a power controller of the circuit board of FIG. 1.

FIG. 4 is a flowchart of a procedure 100 which is performed by the power controller 36 of the circuit board 20 of FIGS. 1 and 2 to conserve power from the backup power supply 56 (FIG. 2) in response to a power failure event. In step 102, the power controller 36 connects the second power plane 26 to the power subsystem 52 such that the second circuit 34 receives a main power signal 74 through the second power plane 26 while the power subsystem 52 provides the main power signal 74 to the first circuit 32. In particular, the power control device 58 closes the switch 60 using the switch signal 82 (FIG. 2). The power controller 36 knows that it is the main power supply 54 which is providing the power signal to the circuit board 20 based on the control signal 78 the power controller 36 receives from the power subsystem 52. Accordingly, the control logic 44 (FIG. 1) of the second circuit 34 can operate the DRAM devices 40 of the first circuit 32 (e.g., direct the DRAM devices 40 to operate in a normal operating mode, periodically refresh memory cells of the DRAM devices 40, etc.).

In step 104, the power controller 36 detects the power failure event (e.g., a failure of the main power supply 54, loss of the main power feed from the street, etc.). In particular, the control signal 78 which the power controller 36 receives from the power subsystem 52 now indicates that a power failure event has occurred and that the power subsystem 52 provides the backup power signal 76 in place of the main power signal 74.

In step 106, the power controller 36 continues to connect the second power plane 26 to the power subsystem 52 for a period of time. In particular, the power control device 58 continues to close the switch 60 (FIG. 2). In one arrangement, the power controller 36 further notifies (see the arrow 80 in FIG. 2) the second circuit 34 that it must place the DRAM devices 40 of the first circuit 32 in self-refresh mode. In another arrangement, the second circuit 34 receives notification that it must place the DRAM devices 40 of the first circuit 32 in self-refresh mode by directly sensing the control signal 78 from the power subsystem 52. In either arrangement, the control logic 42 of the second circuit 34 directs the DRAM devices 40 to complete any operations in progress, and then to enter self-refresh mode. In one arrangement, the second circuit 34 then notifies the power controller 36 through the link 66 that it has completed these tasks. In another arrangement, the power controller 36 simply waits a predetermined amount of time (e.g., 30 seconds, two minutes, etc.) for the control logic 42 to complete these tasks.

In step 108 (i.e., after the power controller 36 has connected the second power plane 26 to the power subsystem 52 for an amount of time and in response to the power failure event), the power controller 36 disconnects the second power plane 26 from the power subsystem 52 (i.e., the power control device 58 opens the switch 60 using the switch signal 82). Accordingly, the second circuit 34 no longer receives the backup power signal 76 from the power subsystem 52.

At this point, the circuit board 20 maintains storage of data within the DRAM devices 40 but consumes less power than when fully operational since the second circuit 34 has been disconnected from the power subsystem 52. As a result, the drain on the power reserve of the backup power supply 56 is reduced. Accordingly, in order to maintain storage of the data within the circuit board 20 for a period of time, the circuit board 20 does not require as large a backup power supply 56 as similar conventional circuit boards which provide backup power to all circuit board circuitry. Furthermore, for the same size backup power supply 56, the circuit board 20 can maintain storage of the data for a longer amount of time than the similar conventional circuit boards which power all circuits and thus drain down the backup power reserve in less time. Further details of the invention will now be provided with reference to FIG. 5.

Figure 5:
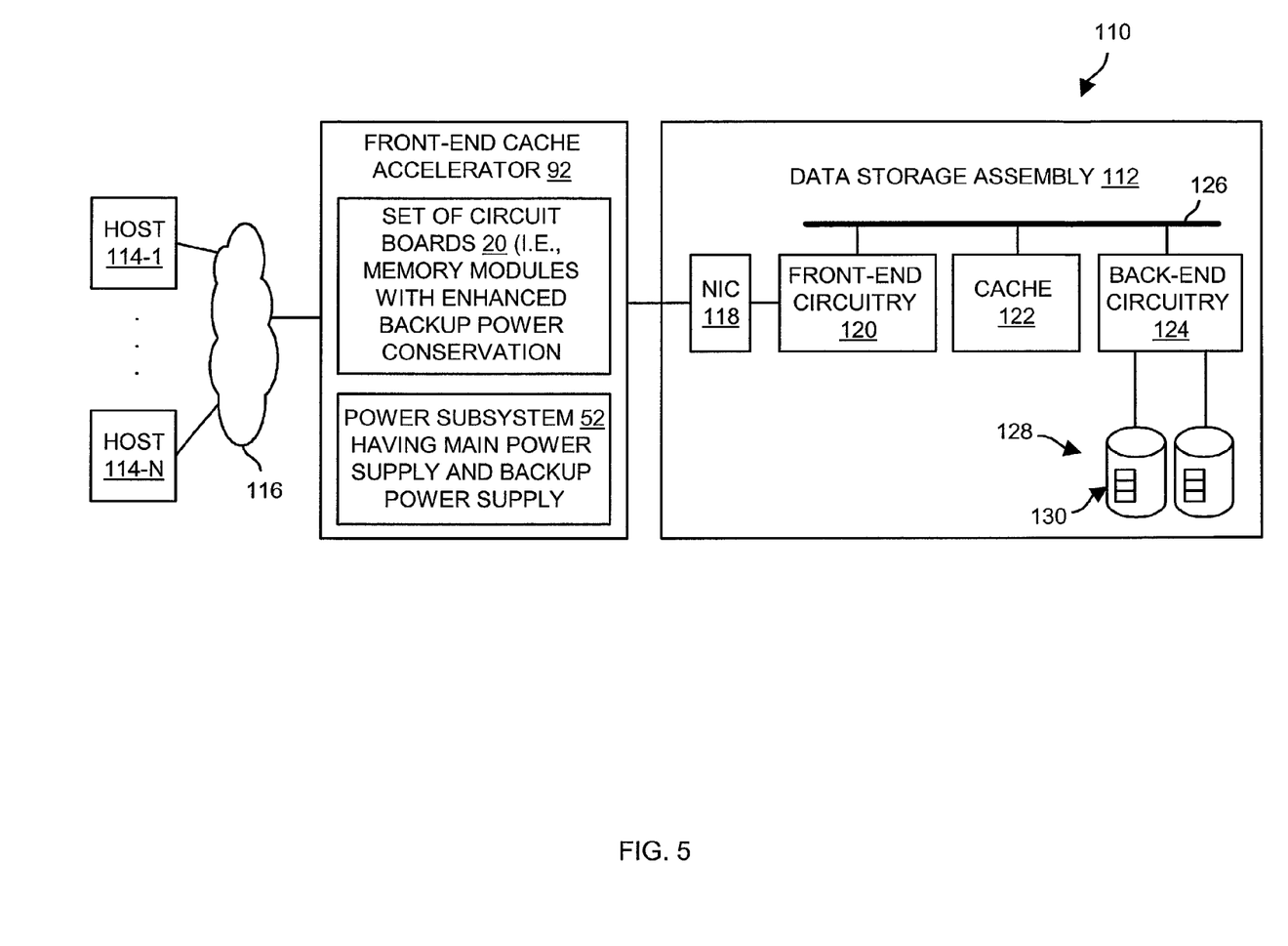
FIG. 5 is a block diagram of a data storage system which includes the electronic system of FIG. 3 as a front-end cache accelerator for a data storage assembly.

FIG. 5 is a block diagram of a data storage system 110 which includes a data storage assembly 112, and the electronic system 92 of FIG. 3 as a front-end cache accelerator (also provided with reference numeral 92) to the data storage assembly 112. The data storage system 110 is configured to perform data storage operations on behalf of a set of hosts 114-1, . . . , 114-N (collectively hosts 114) which connects to the data storage system 110 through a network 116. The DRAM devices 40 within the circuit boards 20 of the electronic system 92 can provide orders of magnitude faster access times and bandwidth than mechanical disk drives thus "accelerating" data storage, i.e., yielding better than average data storage system performance.

The data storage assembly 112 includes a network interface 118, front-end circuitry 120, a cache 122, back-end circuitry 124 and a set of disk drives 128 which is capable of storing data 130. The front-end circuitry 120 operates as an interface between external devices (e.g., the hosts 114, the front-end accelerator 92, etc.) and the cache 122. Similarly, the back-end circuitry 124 operates as an interface between the cache 122 and the set of disk drives 128.

The electronic system 92 operates as a front-end cache accelerator to the data storage system 110 by buffering data sent from the hosts 114 to the data storage assembly 112. The DRAM devices 40 of the circuit boards 20 within the electronic system 92 provide temporary storage which is at least an order of magnitude faster to access than disk drive memory. Accordingly, the hosts 114 can store data within the data storage system 110 quickly by simply completing store operations with the front-end accelerator. The front-end accelerator can then synchronize its memory with the set of disk drives 128 of the data storage assembly 112 at a slower rate (e.g., during non-peak times).

It should be understood that the amount of memory capacity provided by the front-end accelerator is easily scalable. In particular, for more memory capacity, additional circuit boards 20 (i.e., memory modules) can be added. Moreover, no disk drives are required for the front-end accelerator since, during a main power failure event, the circuit boards 20 can maintain data therein for an extended period of time due to their ability to operate at a reduced power consumption rate and thus conserve backup power. When main power returns, the data which has been maintained in the circuit boards 20 can be synchronized to the data storage assembly 112 so that no data is ever lost.

It should be further understood that nothing precludes the front-end accelerator from having one or more disk drives. For example, the front-end accelerator can be configured to synchronize data from the circuit boards 20 to local disk drives immediately in response to a main power failure, and then fully power down in a traditional manner. As another example, the front-end accelerator can be configured to maintain storage of the data within the circuit boards 20 in response to a main power failure, and later synchronize the data to the local disk drives after a particularly long amount of time transpires without return of main power (e.g., if main power does not return after 24 hours). As yet another example, the front-end accelerator can be configured to maintain storage of the data within the circuit boards 20 in response to a main power failure, and synchronize the data to the local disk drives nonetheless as a last precaution in case main power does not return for an extremely long time (e.g., if main power does not return after 48 hours). If main power returns and the data is still available in the circuit boards 20, the electronic system 92 can return to operation as a front-end accelerator without having to reload the data from the local disks.

As described above, the invention is directed to techniques for powering a circuit board 20 (e.g., a memory module) having, among other things, (i) a set of power planes 24, 26 and (ii) circuitry 36 that controls how power is provided to the set of power planes 24, 26. Circuits 32, 34 of the circuit board 20 are configured to electrically connect with a power subsystem 52 having a main power supply 54 (e.g., a converter for a main power feed from the street) and a backup power supply 56. In the event of a main power supply failure, backup power from the backup power supply 56 can be provided to some circuitry 32 on the circuit board 20, and not provided (or only temporarily provided) to other circuitry 34 on the circuit board 20. If not all of the circuitry 34 of the circuit board 20 continues to receive backup power from the backup power supply 56, the rate of backup power consumption is less than that of a conventional approach of providing backup power to all of the circuitry of the entire circuit board. Thus, the required amount of reserve power is not as large as in that conventional approach. Furthermore, in the case of a computer system, if the circuitry 32 which continues to receive backup power can remain operational for a relatively long or extended period of time due to the reduced rate of backup power consumption, there may be no need to synchronize any data to disk and thus no need for a set of disks. Accordingly, one or more of the earlier-described costs and risks associated with performing a complex shutdown procedure (e.g., the costs of a set of disk drives, the chance that the shutdown will not complete properly resulting in lost data, etc.) can be avoided. The features of the invention, as described above, may be employed in data storage systems, apparatus and procedures, as well as other computer-related devices such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

Figure 6:
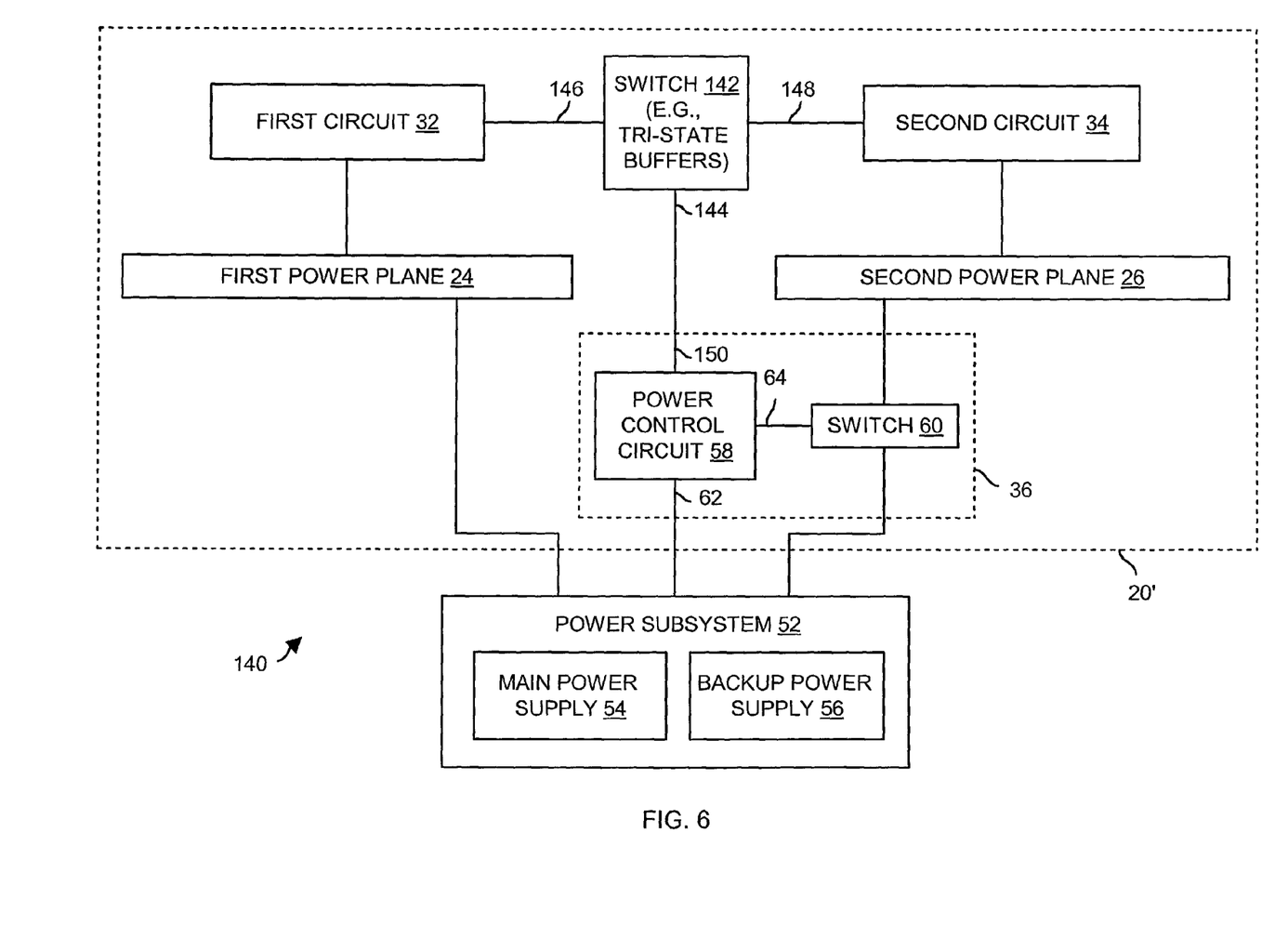
FIG. 6 is a block diagram showing particular details of the circuit board of FIG. 1 which are alternative to that shown in FIG. 2.

For example, as shown in FIG. 6, the power controller 36 can be configured to control switches in addition to the switch 60 in order to improve electrical isolation of circuits within the circuit board 20. By way of example only, FIG. 6 shows a block diagram 140 of an alternative circuit board 20' which is suitable for use in any of the above-described systems 92, 110. The circuit board 20' includes components similar to that of the circuit board 20 of FIG. 2, and operates in a similar manner. However, the circuit board 20' further includes a switch 142 (e.g., a set of tri-state buffers) having a switch input 144, a first terminal 146 which connects with the first circuit 32 and a second terminal 148 which connects with the second circuit 34. The input 144 of the switch 142 connects with an output 150 of the power control circuit 58 of the power controller 36.

When the power subsystem 52 provides the main power signal to the circuit board 20', the power control circuit 58 closes the switch 142 thus enabling the first circuit 32 and the second circuit 34 to communicate with each other. However, after a main power failure event in which the power subsystem 52 replaces the main power signal with the backup power signal, the power control circuit 58 opens the switch 142 to disconnect the first circuit 32 from the second circuit 34. Opening of the switch 142 can occur after an amount of time has been provided to allow the first and second circuits 32, 34 to communicate with each other while operating under backup power (e.g., for control logic 42 of the second circuit 34 to direct DRAM devices 40 of the first circuit 32 to transition to self-refresh mode). Tri-state buffers are well-suited for use as the switch 142 since they can terminate signal lines (e.g., circuit board traces) without concern for any undesirable behavior of components of the second circuit 34 when the backup power is disconnected from the second circuit 34.

Additionally, it should be understood that the circuit boards 20, 20' were described above as being memory modules by way of example only. The circuit boards 20, 20' can be other types of modules as well such as processor modules, network adaptors, application specific modules, and other types of electronic devices.

Furthermore, it should be understood that the power controller 36 was described above and shown as being directly interconnected between the second power plane 26 and the power subsystem 52, by way of example only. In some arrangements, the power controller 36 is indirectly interconnected between the second power plane 26 and the power subsystem 52. For example, in some arrangements, the power controller 36 is directly interconnected between the first power plane 24 and the second power plane 26 in order to provide or not provide the main power signal 74 and the backup power signal 76 from the power subsystem 52 to the second power plane 26 (through the first power plane 24).

Additionally, it should be understood that the circuit boards 20, 20' were described as including a single first power plane 24 and a single second power plane 26 by way of example only. In some arrangements, the circuit boards 20, 20' include multiple first power planes 24. Similarly, in some arrangements, the circuit boards 20, 20' include multiple second power planes 26 which connect with the power controller 36.

Furthermore, it should be understood that the circuit boards 20, 20' were described above as including three power and ground planes: the first power plane 24, the second power plane 26 and a ground plane 28. In other arrangements, the circuit boards 20, 20' include more than three power and ground planes. For example the first and second power planes 24, 26 can be configured to carry 2.5 VDC power signals, and the circuit boards 20, 20' can include additional power planes for carrying power signals of other voltages (e.g., 1.5 VDC, 3.3 VDC, 5.0 VDC, 12.0 VDC, −12.0 VDC, 56 VDC, etc.), and additional ground planes for return currents. Moreover, the power control features described above in connection with the first and second power planes 24, 26 can be applied to these additional planes as well (e.g., the power controller 36 can connect and disconnect the power subsystem 52 to power and ground planes for the other voltages and other strategies for power distribution with the circuit boards 20, 20' in response to a main power supply failure). Such modifications and enhancements are intended to be considered to belong to other embodiments and arrangements of the invention.

What is claimed is:

1. A method for powering a circuit board having a first circuit, a second circuit, a first power plane and a second power plane, the method comprising the steps of:

while a power subsystem provides a main power signal to the first circuit through the first power plane, connecting the second power plane to the power subsystem such that the second circuit receives the main power signal through the second power plane;

detecting a power failure event in which the power subsystem provides a backup power signal in place of the main power signal; and in response to the detected power failure event and while the power subsystem provides the backup power signal to the first circuit through the first power plane, disconnecting the second power plane from the power subsystem such that the second circuit does not receive the backup power signal;

wherein the first circuit includes dynamic random access memory; and wherein the method further comprises the step of storing completed host transactions in the dynamic random access memory of the first circuit while the power subsystem provides the main power signal to the first circuit through the first power plane.

2. The method of claim 1 wherein the step of connecting the second power plane to the power subsystem includes the step of:
  closing a switch which is interconnected between the main power supply and the second power plane in response to a control signal indicating that the power subsystem provides the main power signal; and
wherein the step of disconnecting the second power plane from the power subsystem includes the step of:
  opening the switch in response to the control signal indicating that the power subsystem provides the backup power signal.

3. The method of claim 1, further comprising the step of:
  prior to the step of disconnecting the second power plane from the power subsystem and while the power subsystem provides the backup power signal to the first circuit through the first power plane, connecting the second power plane to the power subsystem in order to provide the backup power signal to the second circuit for a predetermined amount of time.

4. The method of claim 1 wherein the first circuit includes dynamic random access memory, wherein the second circuit includes control logic to operate the dynamic random access memory of the first circuit, and wherein the step of disconnecting the second power plane from the power subsystem includes the step of:
  preventing the control logic from receiving the backup power signal from the power subsystem through the second power plane.

5. The method of claim 1, further comprising the step of:
  operating the dynamic random access memory in a self-refresh mode to maintain storage of the completed host transactions in the dynamic random access memory of the first circuit while the first circuit receives the backup power signal from the power subsystem through the first power plane, and while the second circuit does not receive the backup power signal from the power subsystem through the second power plane.

6. The method of claim 1 wherein the main power signal is a first DC signal, wherein the backup power signal is a second DC signal, and wherein the step of disconnecting the second power plane from the power subsystem includes the step of:
  preventing the second circuit from receiving the second DC signal through the second power plane.

7. The method of claim 1 wherein the step of detecting the power failure event includes:
  identifying failure of an AC main power feed from a street while the circuit board remains disposed within data storage equipment configured to cache data in a set of disk drives on behalf of a set of external host computers.

8. The method of claim 7 wherein the data storage equipment is a front-end accelerator of a networked data storage system containing the set of disk drives; and wherein the step of disconnecting the second power plane from the power subsystem includes the step of:
  extending a time period for data preservation within the front-end accelerator of the networked data storage system containing the set of disk drives.

9. A circuit board, comprising:
  a section of circuit board material having a first power plane, and a second power plane;
  a first circuit disposed on the section of circuit board material and coupled to the first power plane;
  a second circuit disposed on the section of circuit board material and coupled to the second power plane; and
  a power controller disposed on the section of circuit board material and coupled to the second power plane, wherein the power controller is configured to:
    while a power subsystem provides a main power signal to the first circuit through the first power plane, connect the second power plane to the power subsystem such that the second circuit receives the main power signal through the second power plane,
    detect a power failure event in which the power subsystem provides a backup power signal in place of the main power signal, and
    in response to the detected power failure event and while the power subsystem provides the backup power signal to the first circuit through the first power plane, disconnect the second power plane from the power subsystem such that the second circuit does not receive the backup power signal;
  wherein the first circuit includes dynamic random access memory is configured to:
    store completed host transactions while the power subsystem provides the main power signal to the first circuit through the first power plane.

10. The circuit board of claim 9 wherein the power controller includes:
  a switch having a switch input, a first terminal coupled to the second power plane, and a second terminal which is configured to couple to the power subsystem; and
  a power control circuit having a power control input which is configured to couple to the power subsystem and a power control output coupled to the switch input of the switch.

11. The circuit board of claim 10 wherein the power control circuit of the power controller is configured to:
  in response to a control signal on the power control input indicating that the power subsystem provides the main power signal, provide a switch signal on the power control output such that the switch closes to connect the second power plane to the power subsystem; and
  in response to the control signal on the power control input indicating that the power subsystem provides the backup power signal, provide the switch signal on the power control output such that the switch opens to disconnect the second power plane from the power subsystem.

12. The circuit board of claim 9 wherein the power controller is further configured to:
  connect the second power plane to the power subsystem in order to provide the backup power signal to the second circuit for a predetermined amount of time, prior to disconnecting the second power plane from the power subsystem and while the power subsystem provides the backup power signal to the first circuit through the first power plane.

13. The circuit board of claim 9 wherein the first circuit includes dynamic random access memory, wherein the second circuit includes control logic to operate the dynamic random access memory of the first circuit.

14. The circuit board of claim 9 wherein the dynamic random access memory is further configured to:
  operate in a self-refresh mode to maintain storage of the completed host transactions while the first circuit receives the backup power signal from the power subsystem through the first power plane, and while the second circuit does not receive the backup power signal from the power subsystem through the second power plane.

15. The circuit board of claim 9 wherein the main power signal is a first DC signal, wherein the backup power signal is a second DC signal.

16. The circuit board of claim 9 wherein the power controller, when detecting the power failure event, is configured to:
- identify failure of an AC main power feed from a street while the section of circuit board material remains disposed within data storage equipment configured to cache data in a set of disk drives on behalf of a set of external host computers.

17. The circuit board of claim 16 wherein the data storage equipment is a front-end accelerator of a networked data storage system containing the set of disk drives; and wherein the power controller, when disconnecting the second power plane from the power subsystem, is configured to:
- extend a time period for data preservation within the front-end accelerator of the networked data storage system containing the set of disk drives.

18. An electronic system, comprising:
- a power subsystem having a main power supply and a backup power supply;
- a set of circuit boards coupled to the power subsystem, each circuit board including:
  - a section of circuit board material having a first power plane, and a second power plane,
  - a first circuit disposed on the section of circuit board material and coupled to the first power plane,
  - a second circuit disposed on the section of circuit board material and coupled to the second power plane, and
  - a power controller disposed on the section of circuit board material, wherein the power controller is coupled to the second power plane and to the power subsystem, and wherein the power controller is configured to:
    - while the power subsystem provides a main power signal to the first circuit through the first power plane, connect the second power plane to the power subsystem such that the second circuit receives the main power signal through the second power plane,
    - detect a power failure event in which the power subsystem provides a backup power signal in place of the main power signal, and
    - in response to the detected power failure event and while the power subsystem provides the backup power signal to the first circuit through the first power plane, disconnect the second power plane from the power subsystem such that the second circuit does not receive the backup power signal;
- wherein the set of circuit boards is a set of memory modules; and
- wherein the electronic system further comprises:
  - a network interface which is configured to connect to a host, and
  - a control module coupled to the power subsystem and the set of memory modules, wherein the control module is configured to (i) store host transactions from the host in the set of memory modules when the power subsystem provides the main power signal, and (ii) deactivate when the power subsystem provides the backup power signal in place of the main power signal.

19. The electronic system of claim 18 wherein the power controller of each circuit board is further configured to:
- connect the second power plane of that circuit board to the power subsystem in order to provide the backup power signal to the second circuit of that circuit board for a predetermined amount of time, prior to disconnecting the second power plane of that circuit board from the power subsystem and while the power subsystem provides the backup power signal to the first circuit of that circuit board through the first power plane.

20. The electronic equipment of claim 18 wherein the power controller, when detecting the power failure event, is configured to:
- identify failure of an AC main power feed from a street while the section of circuit board material remains disposed within data storage equipment configured to cache data in a set of disk drives on behalf of a set of external host computers.

21. The electronic system of claim 20 wherein the data storage equipment is a front-end accelerator of a networked data storage system containing the set of disk drives; and wherein the power controller, when disconnecting the second power plane from the power subsystem, is configured to:
- extend a time period for data preservation within the front-end accelerator of the networked data storage system containing the set of disk drives.

22. A data storage system, comprising:
- a data storage assembly including a front-end circuit, a cache, a back-end circuit and a set of disk drives, wherein the front-end circuit operates as an interface between an external device and the cache, and wherein the back-end interface operates as an interface between the cache and the set of disk drives;
- a front-end cache accelerator coupled to the data storage assembly, wherein the front-end cache accelerator is configured to communicate with a host and to store completed host transactions which are sent between the host and the data storage assembly, wherein the front-end cache accelerator includes (i) a power subsystem having a main power supply and a backup power supply, and (ii) a set of circuit boards coupled to the power subsystem, and wherein each circuit board includes:
  - a section of circuit board material having a first power plane, and a second power plane,
  - a first circuit disposed on the section of circuit board material and coupled to the first power plane,
  - a second circuit disposed on the section of circuit board material and coupled to the second power plane, and
  - a power controller disposed on the section of circuit board material and coupled to the second power plane, wherein the power controller is configured to:
    - while the power subsystem provides a main power signal to the first circuit through the first power plane, connect the second power plane to the power subsystem such that the second circuit receives the main power signal through the second power plane,
    - detect a power failure event in which the power subsystem provides a backup power signal in place of the main power signal, and
    - in response to the detected power failure event and while the power subsystem provides the backup power signal to the first circuit through the first power plane, disconnect the second power plane from the power subsystem such that the second circuit does not receive the backup power signal.

23. A circuit board, comprising:

a section of circuit board material having a first power plane, and a second power plane;

a first circuit disposed on the section of circuit board material and coupled to the first power plane;

a second circuit disposed on the section of circuit board material and coupled to the second power plane; and a power controller disposed on the section of circuit board material and coupled to the second power plane, wherein the power controller includes:

means for connecting the second power plane to a power subsystem such that the second circuit receives a main power signal through the second power plane while the power subsystem provides the main power signal to the first circuit through the first power plane, means for detecting a power failure event in which the power subsystem provides a backup power signal in place of the main power signal, and means for disconnecting the second power plane from the power subsystem such that the second circuit does not receive the backup power signal in response to the detected power failure event and while the power subsystem provides the backup power signal to the first circuit through the first power plane;

wherein the means for detecting the power failure event includes:

means for identifying failure of an AC main power feed from a street while the section of circuit board material remains disposed within data storage equipment configured to cache data in a set of disk drives on behalf of a set of external host computers.

24. The circuit board of claim 23 wherein the data storage equipment is a front-end accelerator of a networked data storage system containing the set of disk drives; and wherein the means for disconnecting the second power plane from the power subsystem includes:

means for extending a time period for data preservation within the front-end accelerator of the networked data storage system containing the set of disk drives.

\* \* \* \* \*